United States Patent [19]
Karasawa

[11] Patent Number: 5,461,240
[45] Date of Patent: Oct. 24, 1995

[54] RADIATION IMAGE READ-OUT APPARATUS

[75] Inventor: Hiroyuki Karasawa, Kanagawa, Japan

[73] Assignee: Fuji Photo Film Co., Ltd., Tokyo, Japan

[21] Appl. No.: 325,096

[22] Filed: Oct. 17, 1994

[30] Foreign Application Priority Data

Nov. 22, 1993 [JP] Japan .................................. 5-291607

[51] Int. Cl.⁶ ............................ G03B 42/00; G03B 42/02
[52] U.S. Cl. .................................................... 250/585
[58] Field of Search ................................. 250/584, 585, 250/586

[56] References Cited

U.S. PATENT DOCUMENTS

| | | | |
|---|---|---|---|
| 4,689,482 | 8/1987 | Horikawa et al. | 250/585 X |
| 4,832,469 | 5/1989 | Noguchi et al. | 250/585 X |
| 4,876,452 | 10/1989 | Horikawa | 250/585 |
| 4,893,012 | 1/1990 | Agano et al. | 250/585 |
| 4,943,871 | 7/1990 | Miyagawa | 250/585 X |
| 5,047,643 | 9/1991 | Ogura | 250/586 X |

Primary Examiner—Carolyn E. Fields
Assistant Examiner—Edward J. Glick
Attorney, Agent, or Firm—Sughrue, Mion, Zinn, Macpeak & Seas

[57] ABSTRACT

A stimulable phosphor sheet, on which a radiation image has been stored, is exposed to stimulating rays, which cause it to emit light in proportion to the amount of energy stored thereon during its exposure to radiation, and the emitted light is detected by a photodetector. A stimulating ray source for producing the stimulating rays comprises a laser diode, which produces a laser beam having a wavelength $\lambda 1$, a solid laser crystal, which is pumped by the laser beam having been produced by the laser diode and thereby produces a laser beam having a wavelength $\lambda 2$, and a nonlinear optical crystal for converting the laser beam having the wavelength $\lambda 2$ into a laser beam having a wavelength $\lambda 3$, which falls within a stimulation wavelength range for the stimulable phosphor sheet. A first filter is located in an optical path between the stimulable phosphor sheet and the photodetector. The first filter filters out the laser beam having the wavelength $\lambda 3$ and substantially allows the passage of only the light emitted by the stimulable phosphor sheet. A second filter is located in an optical path between the stimulating ray source and the photodetector. The second filter filters out the laser beam having the wavelength $\lambda 1$ and the laser beam having the wavelength $\lambda 2$.

5 Claims, 4 Drawing Sheets

RADIATION IMAGE READ-OUT APPARATUS

BACKGROUND OF THE INVENTION

1. Field of the Invention

This invention relates to a radiation image read-out apparatus, wherein a stimulable phosphor sheet, on which a radiation image has been stored, is exposed to stimulating rays, which cause the stimulable phosphor sheet to emit light in proportion to the amount of energy stored thereon during its exposure to radiation, and the emitted light is photoelectrically detected by a photodetector, an image signal representing the radiation image being thereby obtained. This invention particularly relates to a radiation image read-out apparatus, wherein a laser diode pumped solid laser combined with a nonlinear optical crystal, which converts the wavelength of a solid laser beam into a different wavelength, is employed as the source for producing the stimulating rays.

2. Description of the Prior Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

It is considered to employ a laser diode pumped solid laser as a stimulating ray source in the apparatus for reading out a radiation image from a stimulable phosphor sheet in the manner described above. (The laser diode will hereinbelow be referred to simply as the "LD.") The LD pumped solid laser comprises an LD, which produces a laser beam having a wavelength $\lambda 1$, and a solid laser crystal, which is pumped by the laser beam having been produced by the LD and thereby produces a laser beam having a wavelength $\lambda 2$. However, at present, the wavelength of the laser beam produced by the LD pumped solid laser is different from and far apart from (i.e. markedly longer than) the wavelength, which yields the maximum stimulation efficiency with respect to stimulable phosphor sheets that are used widely in practice. Therefore, it is necessary for the LD pumped solid laser to be used in combination with a nonlinear optical crystal, which shortens the wavelength of the solid laser beam.

In the radiation image read-out apparatus described above, wherein the LD pumped solid laser combined with a nonlinear optical crystal is employed as the stimulating ray source, the problems have heretofore been encountered in that the laser beam, which has the wavelength converted by the nonlinear optical crystal and serves as the stimulating rays, and the other laser beams, i.e. the laser beam, which has been produced by the LD and serves as the pumping beam, and the solid laser beam, which is the fundamental wave before being subjected to wavelength conversion, are detected by the photodetector together with the light emitted by the stimulable phosphor sheet and appear as noise in a reproduced visible radiation image.

SUMMARY OF THE INVENTION

The primary object of the present invention is to provide a radiation image read-out apparatus, wherein a wavelength-converted laser beam, which serves as stimulating rays, and the other laser beams are prevented from being detected by a photodetector, and the occurrence of noise due to such laser beams is thereby restricted.

The present invention provides a radiation image read-out apparatus, wherein a stimulable phosphor sheet, on which a radiation image has been stored, is exposed to stimulating rays, which cause the stimulable phosphor sheet to emit light in proportion to the amount of energy stored thereon during its exposure to radiation, and the emitted light is photoelectrically detected by a photodetector, an image signal representing the radiation image being thereby obtained, the radiation image read-out apparatus comprising:

i) a stimulating ray source for producing the stimulating rays, the stimulating ray source comprising:

a) an LD, which produces a laser beam having a wavelength $\lambda 1$, b) a solid laser crystal, which is pumped by the laser beam having been produced by the LD and thereby produces a laser beam having a wavelength $\lambda 2$, and c) a nonlinear optical crystal for converting the laser beam having the wavelength $\lambda 2$ into a laser beam having a wavelength $\lambda 3$, which falls within a stimulation wavelength range for the stimulable phosphor sheet, ii) a first filter, which is located in an optical path of the laser beam between the stimulable phosphor sheet and the photodetector, and which filters out the laser beam having the wavelength $\lambda 3$ and substantially allows the passage of only the light emitted by the stimulable phosphor sheet, and iii) a second filter, which is located in an optical path of the laser beam between the stimulating ray source and the photodetector, and which filters out the laser beam having the wavelength $\lambda 1$ and the laser beam having the wavelength $\lambda 2$.

With the radiation image read-out apparatus in accordance with the present invention, the laser beam having the wavelength $\lambda 3$ and serving as the stimulating rays, which cause the stimulable phosphor sheet to emit light in proportion to the amount of energy stored thereon during its exposure to radiation, is radiated out of the stimulating ray source. Ordinarily, the laser beam having the wavelength $\lambda 1$, which serves as the pumping beam, and the solid laser beam having the wavelength $\lambda 2$ are also slightly radiated out of the stimulating ray source. Of these laser beams, the laser beam having the wavelength $\lambda 1$ and the laser beam having the wavelength $\lambda 2$ are filtered out by the second filter. Therefore, the problems can be prevented from occurring in that the laser beam having the wavelength $\lambda 1$ and the laser beam having the wavelength $\lambda 2$ are detected by the photodetector and thereby cause noise to occur in a reproduced visible radiation image.

Also, part of the laser beam having the wavelength $\lambda 3$ and serving as the stimulating rays for stimulating the stimulable phosphor sheet is reflected by the stimulable phosphor sheet and travels towards the photodetector in the same manner as that of the light emitted by the stimulable phosphor sheet. However, the laser beam having the wavelength $\lambda 3$ is filtered out by the first filter. Therefore, the problems can be prevented from occurring in that the laser beam having the wavelength $\lambda 3$ is detected by the photodetector and thereby causes noise to occur in a reproduced visible radiation image.

The laser beam having the wavelength λ3 must not be filtered out before it impinges upon the stimulable phosphor sheet. Therefore, in cases where the second filter is located in the optical path between the stimulating ray source and the stimulable phosphor sheet, the second filter should be constituted of a filter, which substantially allows the passage of the laser beam having the wavelength λ3.

Further, the second filter may be combined with the first filter into an integral body. The first filter and the second filter may be of the transmission type or of the reflection type.

DESCRIPTION OF THE PREFERRED EMBODIMENTS

The present invention will hereinbelow be described in further detail with reference to the accompanying drawings.

Figure 1:
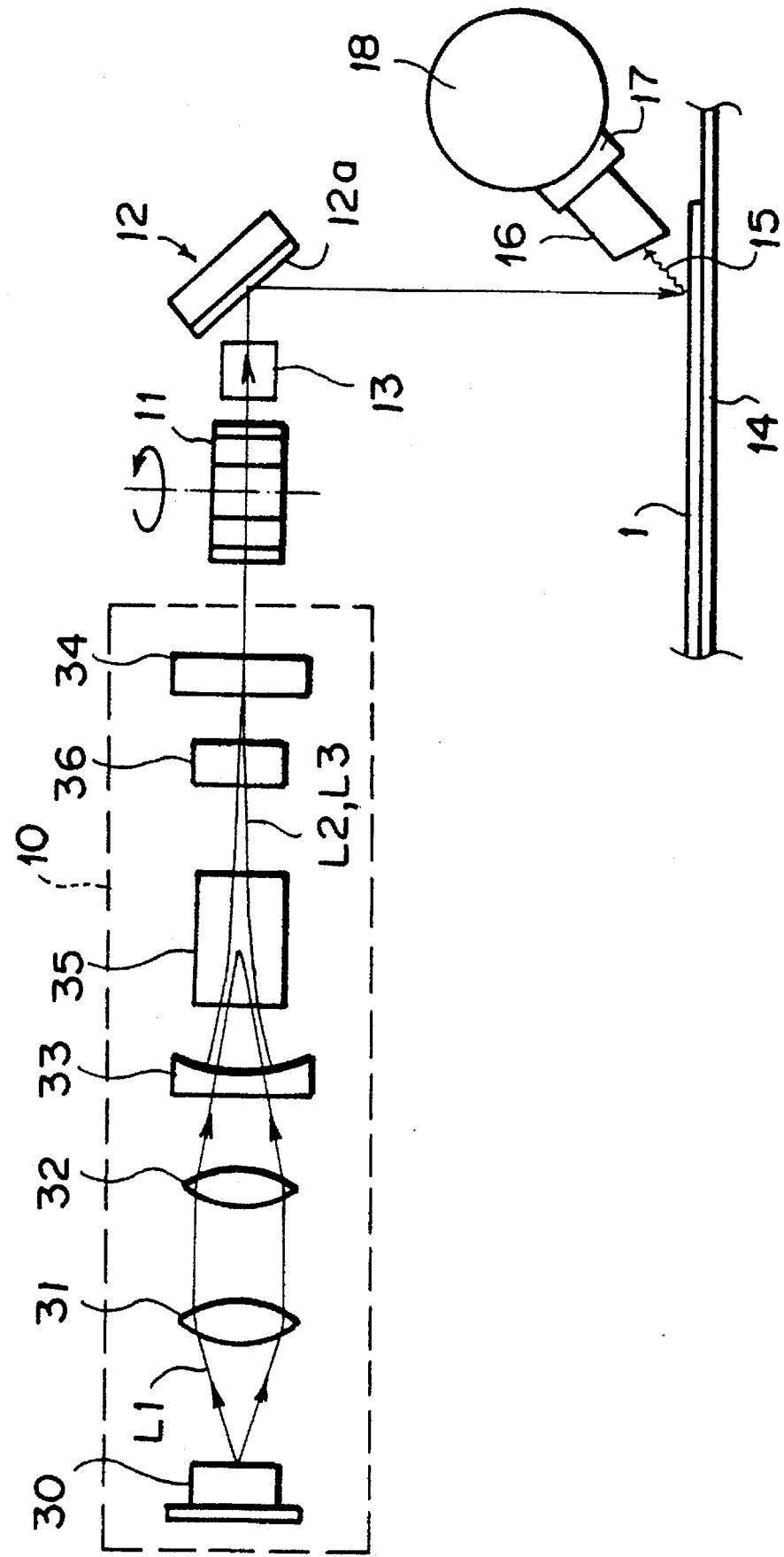
FIG. 1 is a developed side view showing the major part of an embodiment of the radiation image readout apparatus in accordance with the present invention.
Figure 2:
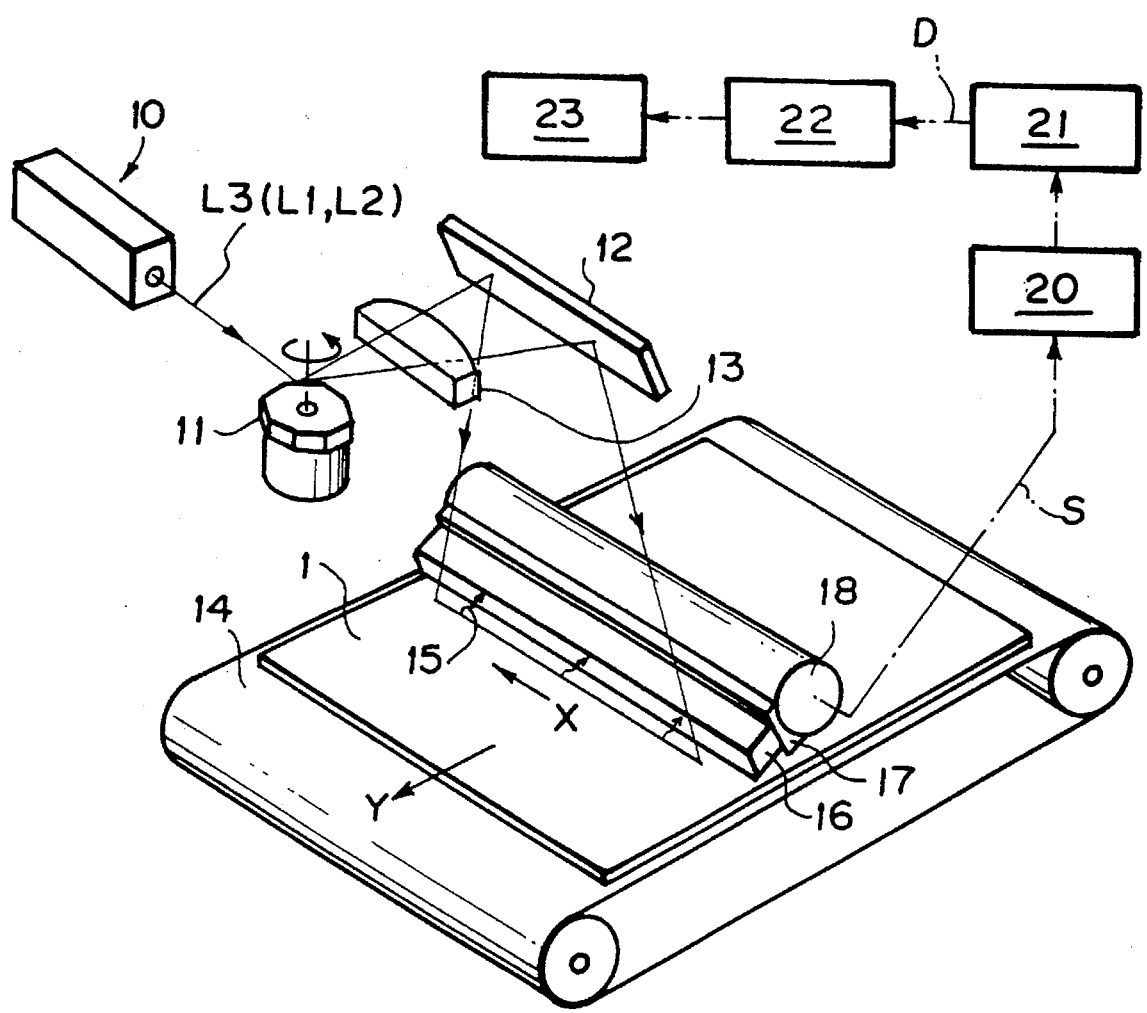
FIG. 2 is a perspective view showing the embodiment of FIG. 1.

FIG. 2 is a perspective view showing an embodiment of the radiation image read-out apparatus in accordance with the present invention. FIG. 1 is a developed side view showing the major part of the embodiment of the radiation image read-out apparatus, i.e. the elements located along the optical path of a laser beam, which serves as stimulating rays.

As illustrated in FIG. 2, a laser beam L3 having a wavelength λ3 and serving as the stimulating rays is produced by a stimulating ray source 10. The laser beam L3 impinges upon a light deflector 11 constituted of a rotating polygon mirror, or the like, and is reflected and deflected by the light deflector 11. The deflected laser beam L3 passes through a scanning lens 13, which is ordinarily constituted of an fθ lens. The laser beam L3 is then reflected by a mirror 12, travels downwardly, and impinges upon a stimulable phosphor sheet 1. On the stimulable phosphor sheet 1, a radiation image of an object has been stored by, for example, exposing the stimulable phosphor sheet 1 to radiation, which has passed through the object. The stimulable phosphor sheet 1 is moved by a sub-scanning means 14, which may be constituted of an endless belt, or the like, in the sub-scanning direction indicated by the arrow Y. At the same time, the laser beam L3, which has been deflected in the manner described above, scans the stimulable phosphor sheet 1 in the main scanning direction indicated by the arrow X.

When the stimulable phosphor sheet 1 is exposed to the laser beam L3, the exposed portion of the stimulable phosphor sheet 1 emits light 15 in an amount proportional to the amount of energy stored thereon during its exposure to the radiation. The emitted light 15 enters a light guide member 16, which extends at least over the entire width of the stimulable phosphor sheet 1. The emitted light 15 is guided inside of the light guide member 16 through repeated total reflection and is received by a long photomultiplier 18. The photomultiplier 18 is provided with a light receiving surface having a length approximately equal to the length of the light guide member 16. The light receiving surface of the photomultiplier 18 receives the emitted light 15 via a filter 17, which will be described later. The photomultiplier 18 thereby generates an analog signal S, which corresponds to the amount of the emitted light 15, i.e. which represents the radiation image stored on the stimulable phosphor sheet 1.

The signal S is logarithmically amplified by a logarithmic amplifier 20 and then fed into an analog-to-digital converter 21. In the analog-to-digital converter 21, the signal S is sampled in accordance with a predetermined picture element clock pulse and converted into a digital image signal D. The digital image signal D is fed into an image processing circuit 22, in which the image processing, such as gradation processing, is carried out on the digital image signal D. The signal obtained from the image processing circuit 22 is fed into an image reproducing apparatus 23 and used for the reproduction of the radiation image as a visible image. The image processing apparatus 23 may be a display means, such as a CRT display device, or a recording apparatus for carrying out a light beam scanning recording operation on photosensitive film.

The stimulating ray source 10, the mirror 12, and the filter 17 will be described hereinbelow with reference to FIG. 1. The stimulating ray source 10 is constituted of an LD pumped solid laser, which is provided with an optical wavelength converting device. Specifically, the stimulating ray source 10 comprises an LD 30, which serves as a pumping source for producing a laser beam L1 serving as a pumping beam, and a collimator lens 31, which collimates the laser beam L1 having been produced as divergent light by the LD 30. The stimulating ray source 10 also comprises a condensing lens 32, which condenses the collimated laser beam L1, and a pair of resonator mirrors 33 and 34, which constitute a Fabry-Pérot type of resonator. The stimulating ray source 10 further comprises a YLF crystal 35, which serves as a solid laser crystal and is located between the mirrors 33 and 34, and an LBO crystal 36, which serves as a nonlinear optical crystal and is located between the mirrors 33 and 34.

In this embodiment, an LD producing the laser beam L1 having a wavelength λ1 of 797 nm is employed as the LD 30. The neodymium (Nd) atoms contained in the YLF crystal 35 are stimulated by the laser beam L1, and the YLF crystal 35 thereby produces a solid laser beam L2 having a wavelength λ2 of 1,313 nm. The solid laser beam L2 resonates between the resonator mirrors 33 and 34. The solid laser beam L2 now having a high intensity impinges upon the LBO crystal 36 and is converted by the LBO crystal 36 into the laser beam L3 having a wavelength λ3=λ2/2=657 nm (i.e. the second harmonic of the solid laser beam L2). The laser beam L3 resonates between the resonator mirrors 33 and 34. Part of the laser beam L3 passes through the mirror 34 and is thus radiated out towards the light deflector 11.

Figure 3:
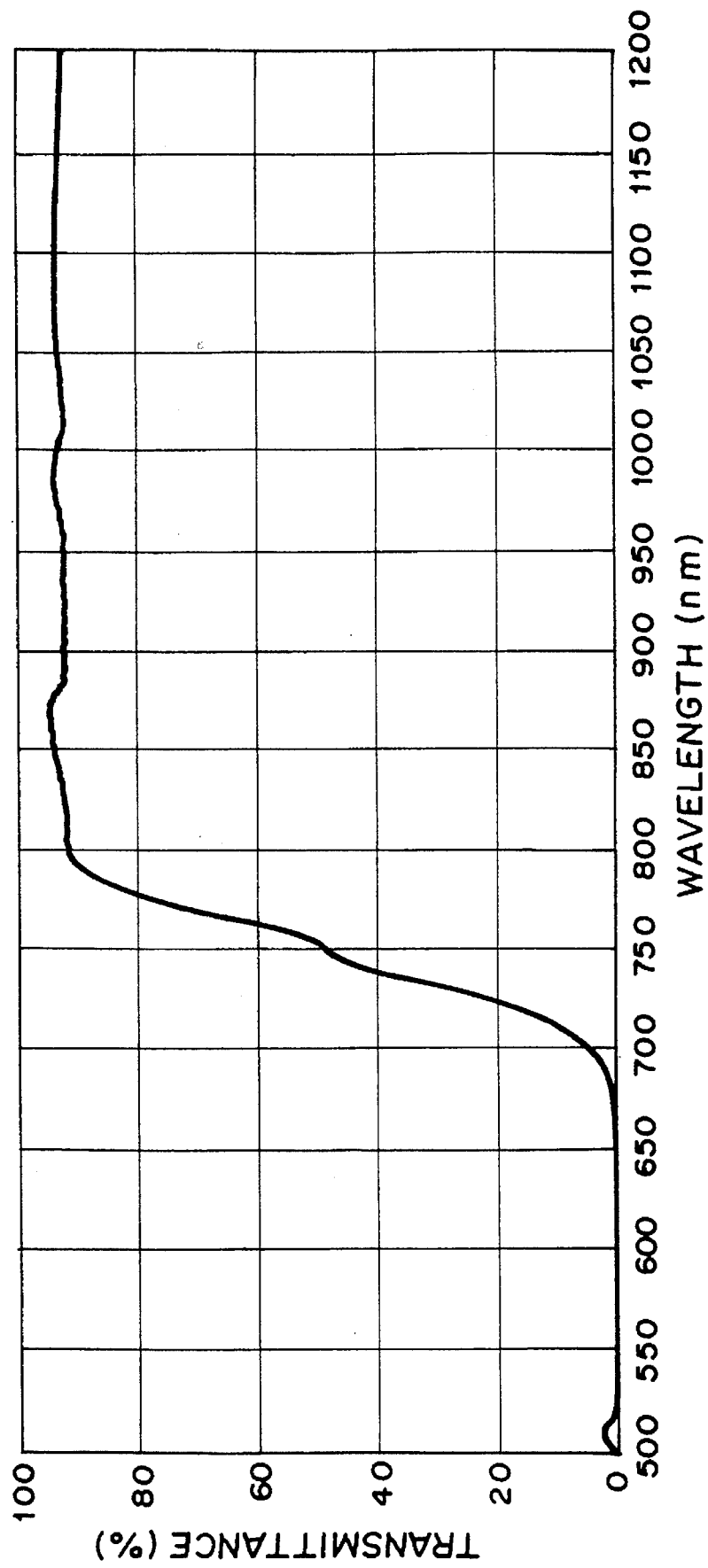
FIG. 3 is a graph showing spectral transmittance characteristics of a second filter employed in the embodiment of FIG. 1.

The resonator mirror 34 is constituted of a mirror capable of substantially reflecting the laser beam L1 having the wavelength λ1 of 797 nm, which serves as the pumping beam, and the solid laser beam L2 having the wavelength λ2 of 1,313 nm, which serves as the fundamental wave before being subjected to the wavelength conversion. However, part of the laser beam L1 and part of the solid laser beam L2 are radiated out of the resonator mirror 34 together with the laser beam L3. Therefore, the aforesaid mirror 12 is provided with a multi-layer film coating 12a, which substantially reflects the laser beam L3 with a reflectivity of at least 99% and which has a reflectivity, e.g., lower than 10% (i.e. a transmittance of at least 90%) with respect to the laser beam L1 and the laser beam L2. By way of example, a cold mirror supplied by Fuji Optical Co., Ltd. may be employed as the mirror 12. FIG. 3 shows the spectral transmittance characteristics of the mirror 12.

Therefore, approximately only the laser beam L3 impinges upon the stimulable phosphor sheet 1. The stimulable phosphor sheet 1 is provided with a layer of a BaFX:Eu phosphor, wherein X represents a halogen element selected from the group consisting of Cl, Br, and I. The wavelength, which yields the maximum stimulation efficiency for the BaFX:Eu phosphor, is in the vicinity of approximately 600 nm. Accordingly, the stimulable phosphor sheet 1 is substantially stimulated with the laser beam L3 having the wavelength $\lambda 3$ of 657 nm. When the BaFX:Eu phosphor is thus stimulated, it emits the light 15 having a wavelength in the vicinity of 400 nm.

The filter 17, which is inserted between the light guide member 16 and the photomultiplier 18, has the characteristics such that it substantially transmits the emitted light 15 having the wavelength in the vicinity of 400 nm and substantially absorbs the laser beam L3 having the wavelength $\lambda 3$ of 657 nm, the laser beam L1 having the wavelength $\lambda 1$ of 797 nm, and the solid laser beam L2 having the wavelength $\lambda 2$ of 1,313 nm. By way of example, the filter 17 may be constituted of a combination of a B-410 filter and a HA-50 filter supplied by Hoya Corp. The B410 filter has the spectral transmittance characteristics indicated by curve "a" in FIG. 4. The HA-50 filter has the spectral transmittance characteristics indicated by curve "b" in FIG. 4.

Figure 4:
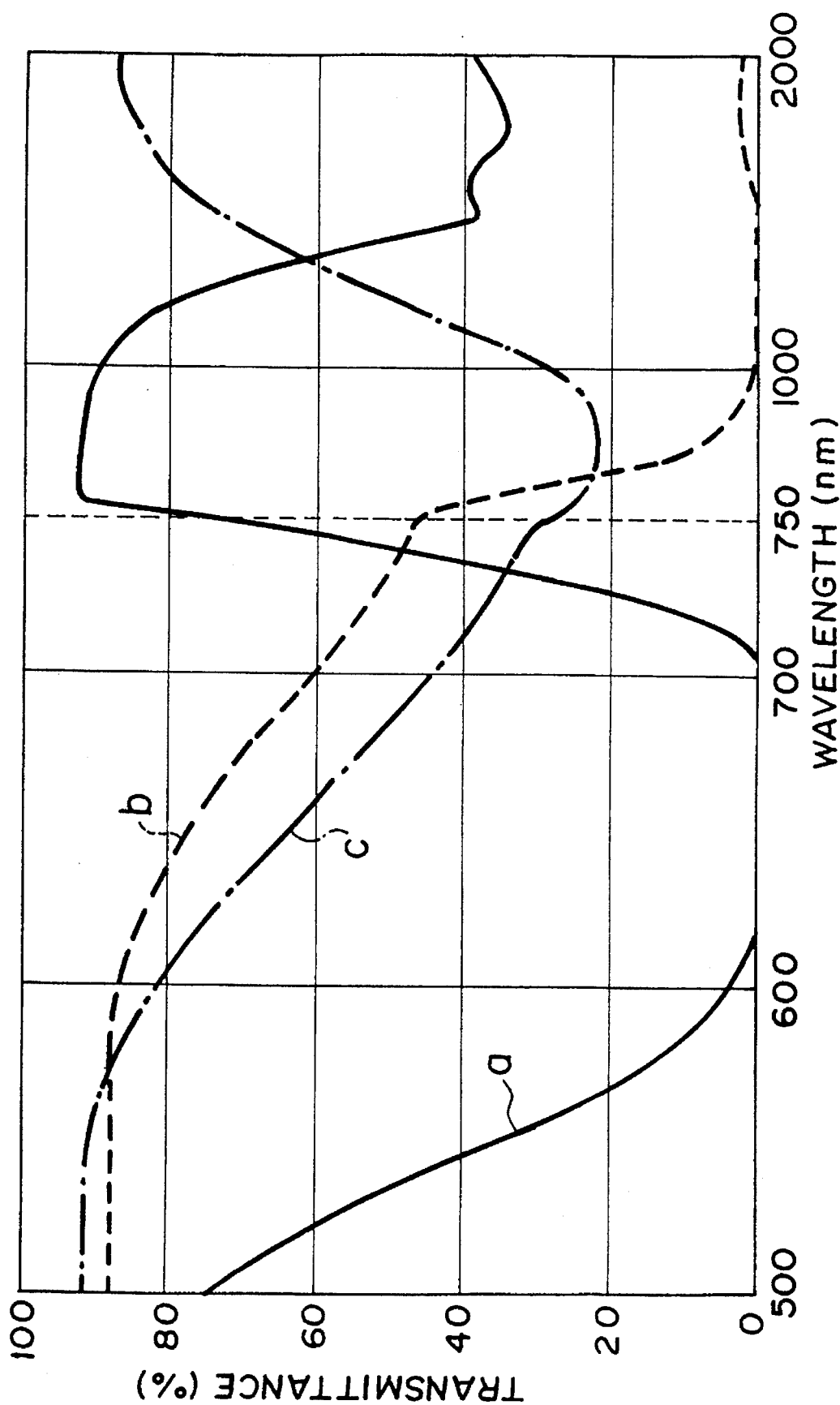
FIG. 4 is a graph showing spectral transmittance characteristics of a first filter employed in the embodiment of FIG. 1.

As illustrated in FIG. 4, the B-410 filter has a very low transmittance with respect to light having the wavelength $\lambda 3$ of 657 nm. However, the transmittance of the B-410 filter with respect to light having a wavelength of not shorter than 800 nm is very high (for example, the transmittance with respect to light having a wavelength of 800 nm, which is close to 797 nm, is 92.8%, and the transmittance with respect to light having a wavelength of 1,300 nm, which is close to 1,313 nm, is 71.2%). Therefore, the HA-50 filter is used in combination with the B-410 filter in order to filter out the laser beam L1 having the wavelength $\lambda 1$ of 797 nm, and the solid laser beam L2 having the wavelength $\lambda 2$ of 1,313 nm. The transmittance of the HA-50 filter is 27.7% with respect to light having a wavelength of 800 nm and is 0.2% with respect to light having a wavelength of 1,300 nm. The transmittances of the filter 17 having the structure described above with respect to the laser beam L1 and the solid laser beam L2 are not so low as the transmittance with respect to the laser beam L3. However, most of the laser beam L1 and most of the solid laser beam L2 have already been filtered out by the mirror 12. Therefore, there is little risk that the laser beam L1 and the solid laser beam L2 impinge upon the photomultiplier 18.

With this embodiment, which is provided with the filter 17 serving as the first filter and the mirror 12 serving as the second filter, the photomultiplier 18 receives approximately only the emitted light 15, and there is little risk that it receives the laser beams L1, L2, and L3. Therefore, the problems can be reliably prevented from occurring in that the laser beams L1, L2, and L3 are received by the photomultiplier 18 and cause noise to occur in the reproduced visible radiation image.

The first filter and the second filter employed in the present invention are not limited to those used in the aforesaid embodiment and may be selected appropriately in accordance with the wavelength $\lambda 1$ of the pumping beam, the wavelength $\lambda 2$ of the solid laser beam, the wavelength $\lambda 3$ of the stimulating rays for stimulating the stimulable phosphor sheet, and the wavelength of the light emitted by the stimulable phosphor sheet. For example, in lieu of the HA-50 filter used in the aforesaid embodiment, a CL-500 filter supplied by Hoya Corp. may be employed. The CL-500 filter has the spectral transmittance characteristics indicated by curve "c" in FIG. 4. The transmittance of the CL-500 filter is 23.2% with respect to light having a wavelength of 800 nm and is 55.6% with respect to light having a wavelength of 1,300 nm.

In the embodiment described above, the filter 17 is provided with the functions for filtering out the laser beams L1 and L2. However, in cases where the laser beams L1 and L2 are filtered out to a practically acceptable level by the mirror 12, the filter 17 need not necessarily be provided with the functions for filtering out the laser beams L1 and L2. Contrarily, in cases where the filter 17 is constituted of a filter, which can substantially filter out the laser beams L1 and L2, the mirror 12 need not necessarily be provided with the filter functions described above.

The solid laser crystal employed in the present invention is not limited to the YLF crystal 35. The radiation image read-out apparatus in accordance with the present invention is also applicable when other solid laser crystals, such as YAG, $YVO_4$, LNP, and NYAB having the wavelength converting function by itself, are used. Also, the nonlinear optical crystal employed in the present invention is not limited to the LBO crystal 36 and may be selected from, for example, KTP, $LiNbO_3$ (i.e. LN), $LiTaO_3$ (i.e. LT), $KNbO_3$, BBO, LN having a periodic domain inversion structure, MgO—LN having a periodic domain inversion structure, and LT having a periodic domain inversion structure.

Further, in the embodiment described above, the second harmonic of the solid laser beam is utilized as the stimulating rays for stimulating the stimulable phosphor sheet. The radiation image read-out apparatus in accordance with the present invention is also applicable when a third harmonic of the solid laser beam or a wave, which has a frequency equal to the sum of the frequencies of the solid laser beam and the laser beam produced by the LD, is utilized as the stimulating rays.

What is claimed is:

1. A radiation image read-out apparatus, wherein a stimulable phosphor sheet, on which a radiation image has been stored, is exposed to stimulating rays, which cause the stimulable phosphor sheet to emit light in proportion to the amount of energy stored thereon during its exposure to radiation, and the emitted light is photoelectrically detected by a photodetector, an image signal representing the radiation image being thereby obtained, the radiation image read-out apparatus comprising:

i) a stimulating ray source for producing the stimulating rays, said stimulating ray source comprising:
  a) a laser diode, which produces a laser beam having a wavelength $\lambda 1$,
  b) a solid laser crystal, which is pumped by the laser beam having been produced by said laser diode and thereby produces a laser beam having a wavelength $\lambda 2$, and
  c) a nonlinear optical crystal for converting the laser beam having the wavelength $\lambda 2$ into a laser beam having a wavelength $\lambda 3$, which falls within a stimulation wavelength range for the stimulable phosphor sheet, ii) a first filter, which is located in an optical path of the laser beam between the stimulable phosphor sheet and the photodetector, and which filters out the laser beam having the wavelength $\lambda 3$ and substantially allows the passage of only the light emitted by the stimulable phosphor sheet, and iii) a second filter, which is located in an optical path of the laser beam between said stimulating ray source and the photodetector, and which filters out the laser beam having the wavelength $\lambda 1$ and the laser beam having the wavelength $\lambda 2$.

2. An apparatus as defined in claim 1 wherein a filter, which substantially allows the passage of the laser beam having the wavelength $\lambda 3$, is employed as said second filter, and said second filter is located in the laser beam optical path between said stimulating ray source and the stimulable phosphor sheet.

3. An apparatus as defined in claim 1 wherein said second filter is combined with said first filter into an integral body and is located in the laser beam optical path between the stimulable phosphor sheet and the photodetector.

4. An apparatus as defined in claim 1 wherein the stimulable phosphor sheet is two-dimensionally scanned with the stimulating rays.

5. An apparatus as defined in claim 1 wherein the laser beam having the wavelength $\lambda 3$ is the second harmonic of the laser beam having the wavelength $\lambda 2$.

* * * * *